(12) United States Patent
Giacoletto et al.

(10) Patent No.: US 9,241,248 B2
(45) Date of Patent: Jan. 19, 2016

(54) MODIFIED PRESENT SIGNAL MODE FOR MOBILE DEVICE

(75) Inventors: Lee M. Giacoletto, Boudler, CO (US); Chetan Khosla, Boulder, CO (US)

(73) Assignee: QUALCOMM Incorporated, San Diego, CA (US)

( * ) Notice: Subject to any disclaimer, the term of this patent is extended or adjusted under 35 U.S.C. 154(b) by 689 days.

(21) Appl. No.: 13/409,072

(22) Filed: Feb. 29, 2012

(65) Prior Publication Data

US 2013/0225117 A1  Aug. 29, 2013

(51) Int. Cl.
*H04W 4/22* (2009.01)
*H04W 4/06* (2009.01)

(52) U.S. Cl.
CPC . *H04W 4/22* (2013.01); *H04W 4/06* (2013.01)

(58) Field of Classification Search
CPC ..... H04W 4/22; H04W 76/007; H04W 64/00; H04M 11/04; G08B 25/016
USPC ............. 455/518, 404.2, 404.1, 456.2, 412.1, 455/466, 455, 420, 456.3, 456.1, 436, 41.2, 455/226.1, 183.2
See application file for complete search history.

(56) References Cited

U.S. PATENT DOCUMENTS

| | | | |
|---|---|---|---|
| 6,047,178 A | 4/2000 | Frlan | |
| 6,363,247 B1 | 3/2002 | Gum | |
| 6,907,238 B2 | 6/2005 | Leung | |
| 6,980,815 B1 | 12/2005 | Enzmann et al. | |
| 7,398,086 B2 | 7/2008 | Morand | |
| 2004/0198381 A1 | 10/2004 | Siegel | |
| 2006/0009191 A1 | 1/2006 | Malone, III | |
| 2006/0135116 A1 | 6/2006 | Scholtz | |
| 2006/0154643 A1 | 7/2006 | Scholz et al. | |
| 2007/0087736 A1 | 4/2007 | Wilson | |
| 2008/0299939 A1 | 12/2008 | Apodaca | |
| 2009/0047958 A1* | 2/2009 | Rimhagen et al. | ............ 455/436 |
| 2009/0075625 A1 | 3/2009 | Jackson et al. | |
| 2010/0115512 A1* | 5/2010 | Sakai | ................ 718/1 |
| 2011/0063105 A1 | 3/2011 | Bennett et al. | |
| 2011/0111726 A1 | 5/2011 | Kholaif et al. | |
| 2011/0210848 A1* | 9/2011 | Howard et al. | .......... 340/539.32 |
| 2012/0115512 A1* | 5/2012 | Grainger et al. | ........... 455/456.3 |
| 2012/0295575 A1* | 11/2012 | Nam | .......................... 455/404.1 |

FOREIGN PATENT DOCUMENTS

JP  2008311702 A  12/2008

OTHER PUBLICATIONS

International Search Report and Written Opinion—PCT/US2013/028470—ISA/EPO—May 23, 2013.

* cited by examiner

*Primary Examiner* — Joseph Arevalo (74) *Attorney, Agent, or Firm* — Berkeley Law & Technology Group, LLP (57) ABSTRACT

Example methods, apparatuses, or articles of manufacture are disclosed herein that may be utilized, in whole or in part, to facilitate or support one or more operations or techniques for a modified present signal mode for use in or with a mobile communication device.

37 Claims, 4 Drawing Sheets

MODIFIED PRESENT SIGNAL MODE FOR MOBILE DEVICE

BACKGROUND

1. Field

The present disclosure relates generally to position or location estimates of mobile communication devices and, more particularly, to a modified present signal mode for use in or with mobile communication devices.

2. Information

Mobile communication devices, such as, for example, cellular telephones, personal digital assistants, electronic book readers, portable navigation units, laptop computers, or the like are becoming more common every day. As geographic barriers to personal travel decrease, mobile communication devices play a significant role in allowing society to maintain its mobility. Continued advancements in information technology, communications, mobile applications, etc. help to contribute to a rapidly growing market for mobile communication devices, which have become ubiquitous and may already be viewed as "extensions of the hand" altering the manner in which society communicates, does business, or creates value.

Certain mobile communication devices, such as location-aware cellular telephones, smart telephones, or the like may, for example, assist in estimating their geographic locations by communicating with one or more wireless transmitters or receivers over a suitable communications network. For example, mobile communication devices may assist in estimating their relative locations based, at least in part, on wireless signals received or acquired from one or more base stations, access points, location beacons, femtocells, or the like via a cellular telephone or like wireless network using known techniques. In some instances, however, such as in an emergency situation or like event (e.g., a natural disaster, etc.), for example, a functioning or active cellular or like wireless communications network may not be available.

BRIEF DESCRIPTION OF THE DRAWINGS

Non-limiting and non-exhaustive aspects are described with reference to the following figures, wherein like reference numerals refer to like parts throughout the various figures unless otherwise specified.

SUMMARY

Example implementations relate to a modified present signal mode for use in or with a mobile communication device. In one implementation, a method may comprise automatically invoking, at a mobile device, a modified present signal mode for transmitting a broadcast signal responsive to a detection of an unavailability of a communications network while in a presence of an emergency condition, wherein the mode is invoked while inside an operational range of the communications network.

In another implementation, an apparatus may comprise a mobile device comprising a transmitter and at least one processor to automatically invoke a modified present signal mode for transmitting a broadcast signal responsive to a detection of an unavailability of a communications network while in a presence of an emergency condition, wherein the mode is invoked while inside an operational range of the communications network.

In yet another implementation, an apparatus may comprise means for inferring, at a mobile device, a presence of an emergency condition; and means for automatically invoking a modified present signal mode for transmitting a broadcast signal responsive to a detection of an unavailability of a communications network while in a presence of an emergency condition, wherein the mode is invoked while inside an operational range of the communications network.

In yet another implementation, an article may comprise a non-transitory storage medium having instructions stored thereon executable by a special purpose computing platform at a mobile device to automatically invoke, at a mobile device, a modified present signal mode for transmitting a broadcast signal responsive to a detection of an unavailability of a communications network while in a presence of an emergency condition, wherein the mode is invoked while inside an operational range of the communications network. It should be understood, however, that these are merely example implementations, and that claimed subject matter is not limited to these particular implementations.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, methods, apparatuses, or systems that would be known by one of ordinary skill have not been described in detail so as not to obscure claimed subject matter.

Some example methods, apparatuses, or articles of manufacture are disclosed herein that may be implemented, in whole or in part, to facilitate or support one or more operations or techniques for a modified present signal mode for use in or with a mobile communication device. As used herein, "mobile device," "mobile communication device," "wireless device," "hand-held device," "location-aware mobile device," or the plural form of such terms may be used interchangeably and may refer to any kind of special purpose computing platform or apparatus that may from time to time have a position or location that changes. In some instances, a mobile communication device may, for example, be capable of communicating with other devices, mobile or otherwise, through wireless transmission or receipt of information according to one or more communication protocols. As a way of illustration, special purpose mobile communication devices, which may herein be called simply mobile devices, may include, for example, cellular telephones, smart telephones, personal digital assistants (PDAs), laptop computers, personal entertainment systems, tablet personal computers (PC), personal audio or video devices, personal navigation devices, or the like. It should be appreciated, however, that these are merely illustrative examples of mobile devices that may be used, at least in part, to implement one or more operations or processes to facilitate or support a modified present signal mode, and that claimed subject matter is not limited in this regard.

As alluded to previously, mobile devices have become ubiquitous and, thus, may have a higher likelihood or probability of being with their owner or user in an emergency situation than specialized search and rescue devices, such as, for example, tracking transponders, distress or homing beacons, survival radios, or the like. A mobile device may, for example, assist in locating a victim, such as a user or owner of the device, for example, in an emergency situation by providing an alert or requesting an emergency response to a location of the mobile device as part of a 911-type emergency response service (e.g., 911, E911, E112, etc.). For example, in an emergency situation, a mobile device may communicate a distress message along with its location estimate via a cellular or like communications network to a call center, which may dispatch an appropriate emergency response team (ERT) to the location. An actual or relative geographic location of a mobile device may, for example, be estimated based, at least in part, on wireless signals provided by one or more suitable communication devices or systems using any one of several location or position estimation techniques. For example, a mobile device may obtain a position estimate or so-called "position fix" by acquiring wireless signals from a satellite positioning system (SPS), cellular base station, access point, location beacon, femtocell, etc. via a cellular telephone or other wireless communications network. In some instances, received wireless signals may be processed in some manner by or at a mobile device, and its actual or relative geographic location may, for example, be estimated using known techniques, such as Advanced Forward Link Trilateration (AFLT), base station identification, heat map signature matching, or the like. It should be noted that terms "user," "owner," or "victim" may be used interchangeably herein.

This system of providing an emergency response relies, however, on a functioning cellular or like wireless communications network, such as, for example, a cellular provider network, wireless ad-hoc network, wireless safety network, or the like, which may present a number of challenges. In some instances, challenges may include, for example, the inability of a mobile device to initiate a transmission of a broadcast signal (e.g., indicative of a location, etc.) without first receiving a pilot-type or like signal from a radio signal source (e.g., a base station, etc.) associated with an active cellular or like wireless communications network. For purposes of explanation, initially, such as at or upon turning on, rebooting, entering a coverage area, transitioning from an "airplane mode," establishing coverage, etc., a mobile device may "listen" (e.g., scan, search, etc.) for a pilot-type or like signal from one or more active or available cellular or like communications networks. Having received a pilot-type or like signal, such as in accordance with a cellular access probe activity, for example, a mobile device may then be capable to initiate a transmission of a so-called standard "present" signal. Typically, although not necessarily, a standard "present" signal may refer to a radio frequency (RF) signal transmitted by a mobile device in response to a received pilot-type or like signal to announce its presence in an area. A standard present signal may, for example, be broadcasted by a mobile device for the purpose of establishing or acquiring applicable cellular network coverage, indicate a particular location, provide a unique identification number, or the like. In other words, in accordance with current standards for cellular communications, a transmission of a broadcast radio signal are initiated by a radio signal source (e.g., a base station, etc.) on an active or functioning cellular or like wireless network rather than a mobile device.

In an emergency situation, however, such as being in a widespread natural disaster (e.g., earthquake, tsunami, tornado, etc.), for example, a functioning or active cellular or like communications network capable of sending a pilot-type or like signal to a mobile device may not be available. For example, otherwise normal operation of a cellular or like communications network may fail due, at least in part, to a collapsed base station or like structural "choke point" associated with a network topology (e.g., a switching center, etc.), loss of power (e.g., at a network server, etc.), loss of a network link, or like failures that may inhibit cellular or like communications. Thus, in some instances, it may be relatively difficult or challenging for an emergency response team to locate a victim of an accident or natural calamity, particularly if a victim is not clearly visible, such as, for example, if caught in an avalanche, buried under a collapsed structure, or the like. It should be appreciated that in some instances it may be presumed that a mobile device is closely associated with a user or owner, such as, for example, co-located with or otherwise attached in some manner to the user's body (e.g., in a pocket, belt clip, backpack, etc.).

Another challenge with typical approaches may be that, in some instances, a victim (e.g., of a natural disaster, etc.) may be incapacitated or unconscious and, as such, may be incapable of detecting an emergency situation in general or activating a mode for initiating a distress message or like signal in particular. Integrating personal locator beacons, such as with a mobile device, for example, may partially help in alerting appropriate authorities to an emergency but may rely on a user manually switching to a beacon mode, activating a beacon, etc., such as by pressing a distress or like button(s) on a mobile device. However, personal locator or like beacons integrated with a mobile device are typically, although not necessarily, comprise location transponders that operate in a manner substantially similar to black boxes currently utilized in an aviation or maritime industry. As such, these devices may need to be compatible or otherwise interface with a Cospas-Sarsat or like satellite-based search-and-rescue (SAR) system, such as by using, for example, one of three Cospas-Sarsat satellite-compatible frequencies. This may be inconvenient at times since an ERT rescuer may need a specialized (e.g., Cospas-Sarsat-compatible, etc.) receiver to monitor for transmissions on these or like emergency frequencies.

In the absence of a compatible emergency receiver, however, if a beacon is activated, such as by a user in distress, for example, a beacon's transmission is typically received by one or more satellites. A satellite then transmits a beacon's signal to a suitable ground control station, which processes the signal and forwards associated information (e.g., location, etc.) to an appropriate national authority. In turn, a national authority forwards suitable information to an appropriate ERT or like party so as to zero-in and conduct search and rescue. This so-called uplink-and-downlink communication along with signal processing, beacon identification, location determination, or the like may, for example, contribute to potentially lengthy delays in emergency responses, especially if a beacon is anonymous or unregistered. As such, in some instances, personal locator or like rescue beacons, integrated or otherwise, may be required to be registered with a national beacon registry, for example, which may also be inconvenient or time-consuming.

In addition, rescue beacons are typically, although not necessarily comprise single-use devices meaning that once activated or used, a beacon may need to be replaced or reprogrammed with a new beacon ID, hex code, etc. re-registered with a beacon registry, or the like, which may, for example, increase cost, maintenance, complexity, etc. of an associated mobile device. Accordingly, it may be desirable to develop one or more methods, systems, or apparatuses that may implement more effective or efficient location or position estimation of a mobile device (and an associated user or owner), such as without utilizing a specialized distress or like emergency equipment, for example, even though a cellular or like wireless communications network is not functional (e.g., failed, etc.). To illustrate, a cellular or like network may not be functional if, for example, one or more supporting components (e.g., a base station, etc.) are destroyed, associated circuits or network links are congested or overloaded, wireless signals are attenuated or otherwise affected in some manner (e.g., insufficient, weak, fragmentary, etc.) so as to preclude their use in an applicable communication, location or position estimation operation or technique, or the like.

As will be described in greater detail below, in an implementation, a mobile device may automatically detect or infer a presence of an emergency condition and may, for example, initially poll an active or available cellular or like wireless communications network to determine whether the network is capable of forwarding a distress message to a call center. Optionally or alternatively, a mobile device may transmit a broadcast signal without an attempt to search for or poll cellular or like wireless communications network while inside an operational range of such a network, for example, such as at or upon automatically detecting or inferring a presence of an emergency condition, as will also be seen. Thus, in some instances, a presence of an emergency condition may be inferred or detected automatically, such as without user input, for example, via one or more signals received or obtained from one or more sensors disposed in a mobile device. At times, a presence of an emergency condition may, for example, be automatically detected or inferred by a mobile device via accessing a suitable memory file, such as a log of broadcasted warning messages or alerts received from an appropriate authority, other users, etc., as will also be seen.

In an implementation, if a cellular or like communications network is not available, such as while in a presence of an emergency condition, a mobile device may invoke a modified present signal mode and may, for example, initiate a transmission of an appropriate broadcast signal. In some instances, a suitable broadcast signal may comprise, for example, a modified "present" signal indicative of a location of a mobile device (and an associated owner) and transmitted without waiting for a pilot-type or like signal from a base station, as per current standards mentioned above. In other words, at times, such as in an emergency situation, for example, it may be advantageous to change or modify one or more current cellular communication standards. For example, it may be desirable to implement a "Modified Condition for 'Present' Signal" standard that may allow a mobile device located inside an operational range of a cellular or like wireless communications network to invoke a modified present signal mode and initiate a transmission of a suitable broadcast signal by automatically detecting an emergency condition despite not being able to receive a pilot-type or like signal or otherwise "hear" such a network.

As used herein, a broadcast signal may refer to any suitable alert or notification capable of guiding an ERT or other search and rescue party to a location of a mobile device. For example, depending on an implementation, a broadcast signal may comprise an audio signal, an encoded RF signal, an ultrasonic signal, a visual signal, just to name a few, or any combination thereof. As was indicated, in some instances, a broadcast signal may comprise, for example, a modified "present" signal transmitted by a mobile device located inside an operational range of a cellular or like wireless communications network to announce its presence in an area without sensing its base station signal, such as in accordance with a Modified Condition for a "Present" Signal approach mentioned above. A modified "present" signal may comprise, for example, an encoded RF signal indicative of a location of a mobile device, providing a unique identification number, condition (e.g., physical, etc.) of a user, or the like. A modified "present" signal may, for example, be implemented (e.g., transmitted, received, etc.) using any suitable air interface for cellular communications that may be applicable to a radio access technology associated with a mobile device, geographic region, or the like. As a way of illustration, a modified "present" signal may, for example, be implemented in accordance with an IS-95, IS-856, IS-2000, or like protocols described, for example, in documents from a consortium named "3rdGeneration Partnership Project" (3GPP), "3rdGeneration Partnership Project 2" (3GPP2), etc. that are publicly available. Of course, these are merely examples relating to a modified "present" signal, and claimed subject matter is not limited in this regard.

As described below, a mobile device may transmit a broadcast signal in any suitable manner, such as repeatedly or recurrently, for example, for a certain time period, or until rescue arrives. As a way of illustration, a signal may, for example, be transmitted via any suitable cellular frequency band applicable to a particular radio access technology (RAT) featured in a mobile device, such as cdma2000, GSM, or the like. In addition, a broadcast signal may be transmitted simultaneously or in any suitable sequence, at any pre-defined time intervals, such as once every three seconds, for example, or in a certain signaling pattern. For example, in some instances, a signaling pattern may comprise transmitting six signals within one minute, then pausing for one minute, and repeating the pattern, just to illustrate one possible implementation. Also, a broadcast signal may be transmitted continually, for example, or periodically so as to conserve battery power. Depending on an implementation, a suitable broadcast signal, such as an encoded RF signal, modified present signal, or the like may have, for example, a unidirectional radiation pattern, omnidirectional radiation pattern, or any combination thereof. Claimed subject matter is not limited to these particular broadcast signals, RATs, time intervals, or signaling or radiation patterns, of course.

As previously mentioned, a mobile device may feature one or more sensors that may provide measurement signals to a suitable processor, such as an application processor associated with the mobile device, for example, to facilitate or support a detection or inference of a presence of an emergency condition. For example, a mobile device may feature one or more accelerometers, gyroscopes, magnetometers, ambient light detectors, proximity sensors, temperature sensors, etc. capable of measuring the direction of gravity, spatial orientation, linear or angular motion, ambient environment, or other force or field experienced by the device. Sensors may be utilized individually, for example, or may be used in combination with other sensors, depending on an application, ambient environment, emergency condition, or the like.

An accelerometer, for example, may sense a direction of gravity toward the center of the Earth and may detect or measure a motion with reference to one, two, or three directions often referenced in a Cartesian coordinate space as dimensions or axes X, Y, and Z. Optionally or alternatively, an accelerometer may also provide measurements of magnitude of various accelerations, for example. A direction of gravity may be measured in relation to any suitable frame of reference, such as, for example, in a coordinate system in which the origin or initial point of gravity vectors is fixed to or moves with a mobile device. It should be appreciated that in some instances it may be presumed that a mobile device may be co-located with a portion of the user's body, such as, for example, in a pocket, belt clip, or the like, in which case the origin of vectors may be fixed or move with the user. An example coordinate system that may be used, in whole or in part, to facilitate or support one or more operations or techniques for a modified present signal mode will be described in greater detail below in connection with FIG. 1. A gyroscope may utilize the Coriolis effect and may provide angular rate measurements in roll, pitch, or yaw dimensions and may be used, for example, in applications determining heading or azimuth changes. A magnetometer may measure the direction of a magnetic field in X, Y, Z dimensions and may be used, for example, in sensing true North or absolute heading in various navigation applications.

Figure 1:
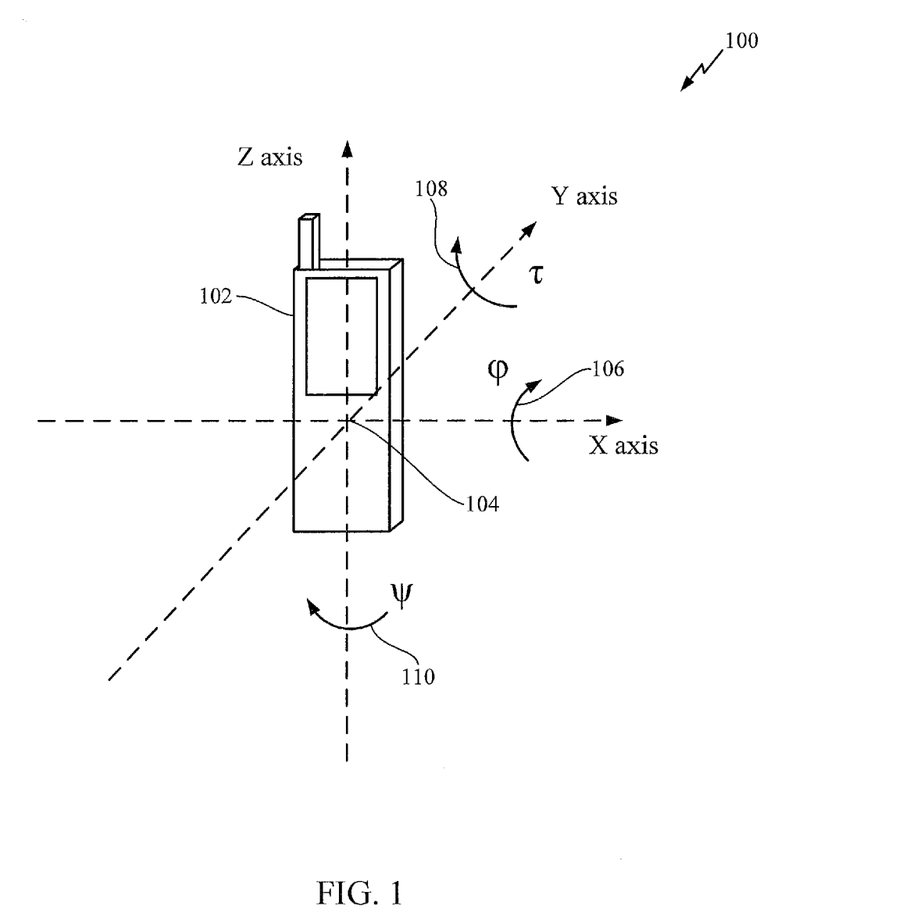
FIG. 1 is an example coordinate system that may be used to facilitate or support one or more operations or techniques for a modified present signal mode according to an implementation.

Following the above discussion, a modified present signal mode may, for example, be invoked at a mobile device while in a presence of an emergency condition, such as an unexpected change in an ambient light (e.g., during daytime, etc.), sudden change in elevation, sudden "jerking," waving, tumbling, or like rather unnatural motions not associated with a typical behavior of a user interacting with a mobile device. FIG. 1 illustrates an implementation of an example coordinate system 100 that may be used, in whole or in part, to facilitate or support one or more operations or techniques for invoking a modified present signal mode in some manner, such as at a mobile device 102, for example. As illustrated, example coordinate system 100 may comprise, for example, three-dimensional Cartesian coordinate system, though claimed subject matter is not so limited. In this illustrated example, one or more translational aspects or characteristics of motion of mobile device 102 representing, for example, acceleration may be detected or measured, at least in part, by a suitable accelerometer, such as a 3D accelerometer, with reference to three dimensions or axes X, Y, and Z relative to an origin 104 of example coordinate system 100. It should be appreciated that example coordinate system 100 may or may not be aligned with a body of mobile device 102. It should also be noted that in certain implementations a non-Cartesian coordinate system may be used or that a coordinate system may define dimensions that are mutually orthogonal.

One or more rotational aspects or characteristics of motion of mobile device 102, such as orientation changes about gravity, for example, may also be detected or measured, at least in part, by a suitable accelerometer with reference to one or two dimensions. For example, rotational motion of mobile device 102 may be detected or measured in terms of coordinates ($\phi$, $\tau$), where phi ($\phi$) represents roll or rotation about an X axis, as illustrated generally by arrow at 106, and tau ($\tau$) represents pitch or rotation about an Y axis, as illustrated generally at 108. Accordingly, here, a 3D accelerometer may detect or measure, at least in part, a level of acceleration vibration as well as a change about gravity with respect to roll or pitch dimensions, for example, thus, providing five dimensions of observability (X, Y, Z, $\phi$, $\tau$). It should be understood, however, that these are merely examples of various motions that may be detected or measured, at least in part, by an accelerometer with reference to example coordinate system 100, and that claimed subject matter is not limited to these particular motions or coordinate system.

At times, one or more rotational aspects or characteristics of motion of mobile device 102 may, for example, be detected or measured, at least in part, by a suitable gyroscope capable of providing adequate degrees of observability, just to illustrate another possible implementation. For example, a gyroscope may detect or measure rotational motion of mobile device 102 with reference to one, two, or three dimensions. Thus, gyroscopic rotation may, for example, be detected or measured, at least in part, in terms of coordinates ($\phi$, $\tau$, $\psi$), where phi ($\phi$) represents roll or rotation 106 about an X axis, tau ($\tau$) represents pitch or rotation 108 about a Y axis, and psi ($\psi$) represents yaw or rotation about a Z axis, as referenced generally at 110. A gyroscope may typically, although not necessarily, provide measurements in terms of angular acceleration (e.g., a change in an angle per unit of time squared), angular velocity (e.g., a change in an angle per unit of time), or the like. Of course, details relating to various motions that may be detected or measured, at least in part, by a gyroscope with reference to example coordinate system 100 are merely examples, and claimed subject matter is not so limited.

In certain implementations, mobile device 102 may include one or more ambient environment or like sensors, such as, for example, an ambient light detector, a proximity sensor, a temperature sensor, a barometric pressure sensor, or the like. For example, a proximity sensor may typically comprise an infrared (IR) emitter-receiver pair placed sufficiently closely on mobile device 102 so as to detect a presence of nearby objects, measure a distance to such objects, etc. without physical contact. A proximity sensor may be often featured in mobile devices to turn off a display while not in use, for example, deactivate a touch screen to avoid unwanted input during a call, or the like. Certain implementations of mobile device 102 may feature an ambient light detector to help in adjusting a touch screen backlighting or visibility of a display in a dimly lit environment, for example, via measuring an increase in luminous intensity of the ambient light. Ambient environment sensors are generally known and need not be described here in greater detail.

It should be appreciated that in some example implementations mobile device 102 may include other types of sensors beyond sensors listed herein so as to facilitate or support one or more operations or techniques for invoking a modified present signal mode, as described below. For example, mobile device 102 may include one or more digital cameras that may track optical motion of an ambient environment so as to make a context-relevant inference, facilitate or support context recognition, or the like. In addition, mobile device 102 may be equipped, for example, with a microphone capable of monitoring a user's voice level, speech variations, or the like for biometric or physical irregularities. In certain implementations, one or more biometric or health sensors (e.g., a thermometer, heart rate or pulse monitor, wireless ear bud, etc.) may be employed to monitor a user's body temperature, heat flux or distribution, heart rate, pulse, oxygen level, or the like. Of course, these are merely examples relating to sensors that may be used, at least in part, to infer or detect a presence of an emergency condition, and claimed subject matter is not so limited.

Figure 2:
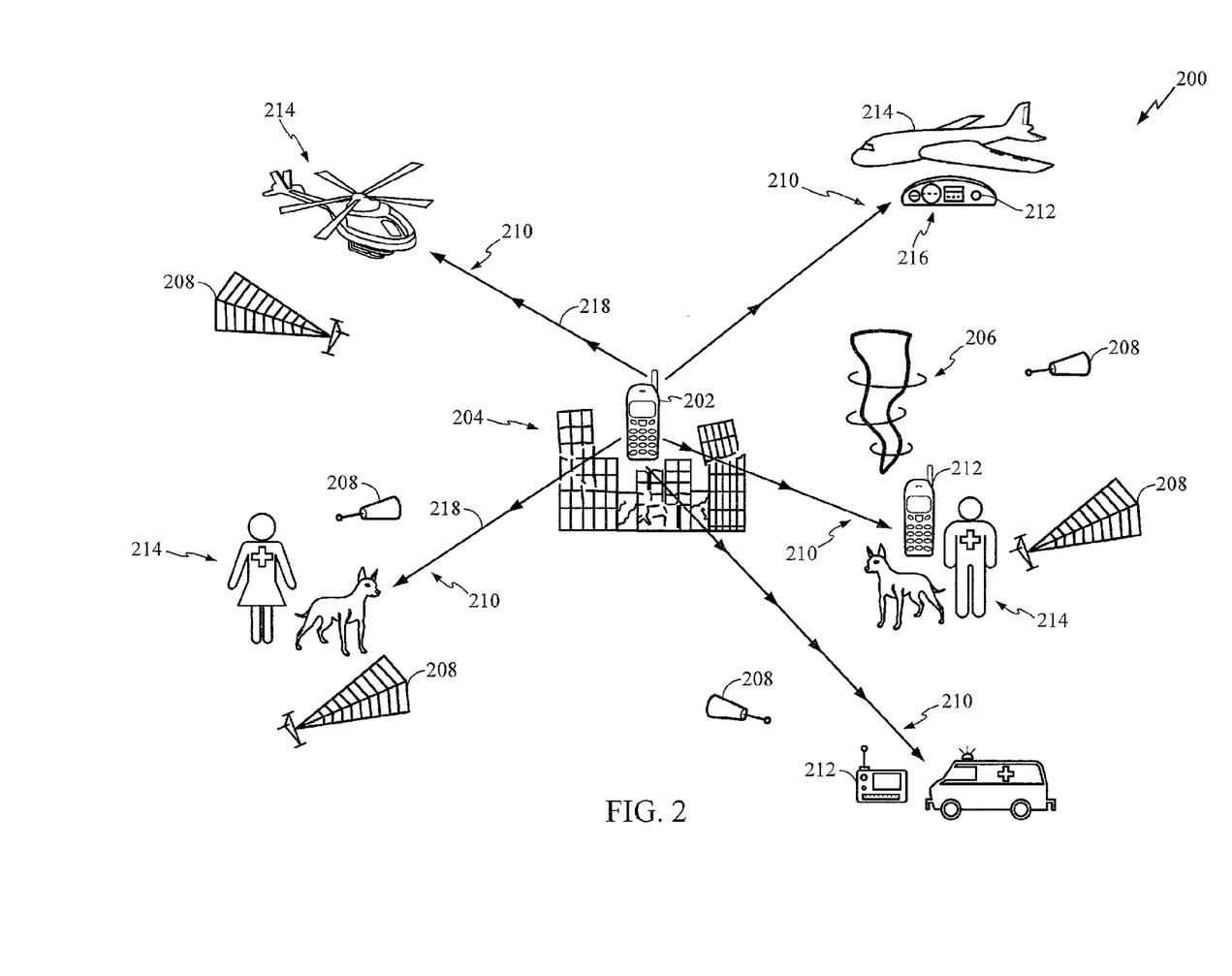
FIG. 2 is an example signaling environment in which a modified present signal mode may be performed according to an implementation.

FIG. 2 is an implementation of an example signaling environment 200 in which one or more processes or operations for a modified present signal mode may be performed, in whole or in part. It should be appreciated that a modified present signal mode may, for example, be implemented in connection with an urban search and rescue, mountain search and rescue, water search and rescue, air-sea or air-land search and rescue, or the like, or any combination thereof.

As illustrated, signaling environment 200 may include, for example, a mobile device 202 that may detect or infer a presence of an emergency condition using one or more appropriate techniques, such as one or more techniques discussed above. As previously mentioned, in some instances, an emergency condition may be detected or inferred automatically, such as, for example, without user input via one or more measurement signals received or obtained from one or more sensors disposed in mobile device 202. As a way of illustration, a presence of an emergency condition, such as, for example, a sudden change in elevation (e.g., a floor drop, etc.), ambient environment (e.g., thick dust, etc.), etc. due to a structural collapse, as illustrated schematically at 204, may be detected or inferred via an accelerometer, gyroscope, or potentially an ambient light detector, though claimed subject matter is not so limited. Various other sensors associated with mobile device 202, such as, for example, biometric or health sensors may also be employed, as was also indicated. As was indicated, an automatic detection or inference of a presence of an emergency condition, such as without user input, for example, may provide an advantage if a user is incapacitated, trapped in confined space, etc. following a natural disaster, such as an earthquake, tornado, or the like, as referenced generally at 206.

In some instances, such as while inside an operational range of a cellular or like wireless communications network, for example, mobile device 202 may detect a presence of an emergency condition and may check for an unavailability of such a network using known techniques. This may at least partially ensure that a modified present signal mode is not invoked inadvertently or unintentionally, such as, for example, upon impact, if mobile device 202 accidentally falls out of a user's pocket or backpack into a deep snow, sand, or the like. In other words, at times, an unavailability of a cellular or like wireless communications network while inside an operational range of such a network during a detected emergency condition may, for example, be indicative of a higher likelihood or probability of a non-false notification or alert of an emergency situation, such as a widespread natural disaster, transportation accident, or the like so as to warrant invoking a modified present signal mode. An unavailability of a cellular or like network may, for example, be detected via dropped cell coverage (e.g., sudden, prolonged, etc.), insufficient signal quality characteristics (e.g., signal strength, etc.), disappearance of a link from a known radio source, or the like. A non-functional or failed cellular or like wireless communications network is illustrated schematically herein via a number of toppled base stations, access points, etc. at 208.

At times, a presence of an emergency condition may, for example, be detected or inferred by a mobile device via accessing a suitable memory file, such as a log of broadcasted warning messages or alerts received from an appropriate authority, other users, etc. For example, having detected an unavailability of a cellular or like network, such as via dropped cell coverage, etc., a mobile device may consult one or more recent log entries stored in memory of the device to determine whether any warnings have been issued, whether a mobile device is in a threatened or affected geographical area, or the like. A warning may, for example, be received via an appropriate RF communications channel (e.g., a civil emergency broadcast network, weather or geological service, reverse 911 call, etc.) broadcasting pre-recorded or live messages with an emergency status, current or pending warnings or alerts, or the like. Optionally or alternatively, a warning message may, for example, be communicated to a mobile device from another device, mobile or otherwise, such as via a voice message, e-mail, SMS message, or the like. Of course, these are merely example details relating to information that a mobile device may utilize or consider, at least in part, to detect or infer a presence of an emergency condition, and claimed subject matter is not so limited.

According to an implementation, having detected an unavailability of a cellular or like wireless communications network while in a presence of an emergency condition, mobile device 202 may invoke a modified present signal mode so as to transmit a suitable broadcast signal in some manner, such as in a manner discussed above, for example. As alluded to previously, a modified present signal mode may be invoked automatically, such as without user input, for example, in response to such a detection. As was also indicated, a broadcast signal may comprise, for example, any suitable alert or notification, referenced generally at 210, capable of guiding an ERT or other search and rescue party to a location of a user associated with mobile device 202. For example, broadcast signal 210 may comprise an audio signal, an encoded RF signal, an ultrasonic signal, a visual signal, a modified present signal, etc. indicative of a location of mobile device 202. As discussed above, at times, broadcast signal 210 may, for example, be capable of being transmitted by mobile device 202 without receiving or sensing a pilot-type or like signal from a base or like station while inside an operational range of a cellular or like wireless communications network.

In some instances, broadcast signal 210 may comprise, for example, a peer-to-peer-type broadcast signal. As used herein, "peer-to-peer-type broadcast signal" may refer to one or more suitable broadcast signals that may be communicated by a mobile device directly to a peer device, such as, for example, in an absence of or otherwise without utilizing a cellular or like wireless communications network, uplink-and-downlink-type communication discussed above, or the like. At times, a peer-to-peer-type broadcast signal may comprise, for example, an encoded RF signal, modified present signal, or like radio signal capable of being detected or processed in some manner by a peer device in an absence of or without utilizing a cellular provider network, wireless ad-hoc network, wireless safety network, wireless emergency communications network, or the like. For example, a peer-to-peer-type broadcast signal may comprise a one-way broadcast signal encoded in some manner with suitable information (e.g., a cell phone ID or call sign, cell phone location, user-related information, etc.) that a peer device may be capable of reading or decoding to determine or obtain a victim's location, condition, etc., just to illustrate one possible implementation. In some instances, such as with respect to a modified present signal, for example, a peer device may be capable of receiving, processing decoding, etc. the signal without utilizing a specialized distress or like emergency equipment (e.g., a Cospas-Sarsat compatible emergency locator, SAR frequency device, etc.). Of course, a peer-to-peer-type signal is merely an example of a broadcast signal that may be transmitted by a mobile device in connection with a modified present signal mode, and claimed subject matter is not limited in this regard.

Thus, as illustrated, signaling environment 200 may comprise, for example, a number of peer devices 212 that may be associated with one or more ERTs or other search and rescue parties, indicated generally at 214, which may be supported by rescue vehicles, planes, helicopters, animals, or the like. In this context, "peer device" may refer to one or more special purpose computing platforms or apparatuses having one or more relatively similar or equipotent functionalities or features that may facilitate or support one or more processes or operations associated with a modified present signal mode. In some instances, peer devices 212 may comprise, for example, mobile devices, as defined above, capable of communicating with other devices, peer or otherwise, through wireless transmission or receipt of information. As a way of illustration, peer devices may include, for example, cellular telephones, smart telephones, personal tracking devices, femtocells, personal navigation devices, survival radios, search and rescue transponders, radio direction finders, or the like. It should be appreciated, however, that these are merely illustrative examples of peer devices that may be used, at least in part, to facilitate or support a modified present signal mode, and that claimed subject matter is not limited in this regard.

For example, in addition to an encoded signal reading capability mentioned above, peer devices 212 may feature a radio direction finding (RDF) capability that may be utilized, at least in part, to determine a direction to or location of a transmitting source, such as mobile device 202, using appropriate techniques. In some instances, peer devices 212 may comprise, for example, a radio-magnetic indicator (RMI) that may provide a relative bearing to or from mobile device 202 to an EMT or like rescue operator (e.g., via a display, etc.). At times, such as if mobile device 202 is transmitting a broadcast signal comprising one or more sound waves in an ultrasonic range, for example, peer devices 212 may employ suitable sound waves-related technology (e.g., ultrasonic sensors, etc.) to determine location of mobile device 202, as another possible example.

As previously mentioned, peer devices 212 may be associated with a suitable rescue or like aircraft and may comprise, for example, on-board RF receivers, dashboard RMIs, automatic direction finders (ADFs), or the like, as referenced generally at 216. These peer devices may assist ERTs or other search and rescue parties with locating the origin of broadcast signal 210 by, for example, performing a radio station passage operation, helping to conduct a visual inspection of a geographic area, or the like. In some instances, peer devices 212 associated with an aircraft may identify how many broadcast signals are present in an affected geographic area and may communicate findings to one or more ground teams, for example, which may zero-in on a victim's location using one or more appropriate techniques. As also illustrated, an audio or visual broadcast signals, referenced at 218, may help in alerting or pointing rescue animals or ERT personnel who are not carrying a peer device toward a location of mobile device 202, thus, providing alternative or supplemental options for effectively conducting search and rescue.

Accordingly, as discussed herein, a modified present signal mode may be used, at least in part, in or with a suitable mobile device, such as mobile device 202, for example, and may provide benefits. For example, as previously mentioned, mobile communication devices, such as cellular telephones, smart telephones, etc. have become ubiquitous and, as such, may have a relatively higher probability or likelihood of being with their owner at a time of an accident, natural calamity, or the like. In addition, a modified present signal mode may, for example, be invoked in a peer-to-peer-type communication or independently of a cellular or like wireless communications network, uplink-and-downlink communications, etc. As such, it may be advantageously employed in an emergency or natural disaster situation where network coverage has failed as well as during commercial power or service outages. It may also augment or otherwise supplement in an effective or efficient manner existing emergency services due, at least in part, to one or more additional modes of communication via, for example, audio, visual, or ultrasonic broadcast signals. For example, certain ERT or like personnel, such as rescuers without an access to a peer device or rescue animals may be capable of searching or tracking a location of a victim based, at least in part, on audible or visual cues provided by an associated mobile device. In addition, a modified present signal mode may be invoked automatically, such as via a context-relevant decision by a mobile device without user input, for example, if a user is trapped in confined space or otherwise incapable of invoking a mode manually. Of course, such a description of certain aspects of a modified present signal mode and its benefits is merely an example, and claimed subject matter is not so limited.

Figure 3:
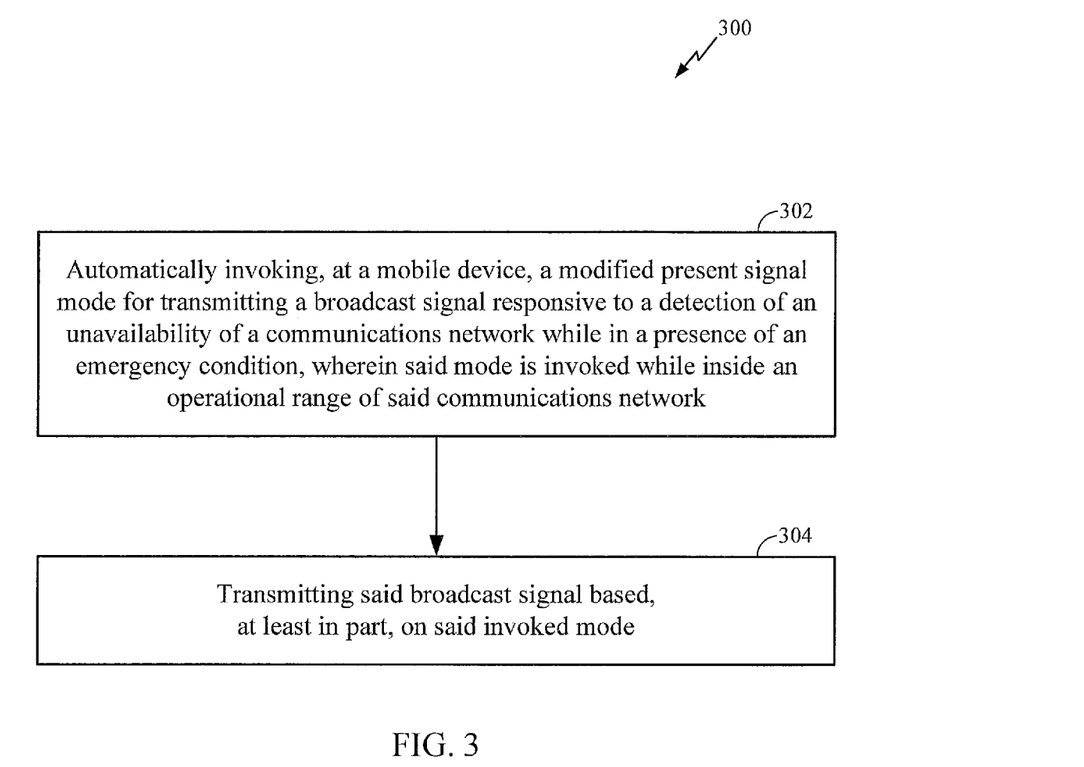
FIG. 3 is a flow diagram illustrating an example process for a modified present signal mode according to an implementation.

Attention is now drawn to FIG. 3, which is a flow diagram illustrating an implementation of an example process 300 that may be implemented, in whole or in part, to facilitate or support one or more operations or techniques for a modified present signal mode for use in or with a mobile communication device. It should be appreciated that even though one or more operations are illustrated or described concurrently or with respect to a certain sequence, other sequences or concurrent operations may also be employed. In addition, although the description below references particular aspects or features illustrated in certain other figures, one or more operations may be performed with other aspects or features.

Example process 300 may begin at operation 302, for example, with automatically invoking, at a mobile device, a modified present signal mode for transmitting a broadcast signal responsive to a detection of an unavailability of a communications network while in a presence of an emergency condition. As previously mentioned, a modified present signal mode may, for example, be invoked without user input while inside an operational range of such a communications network. A broadcast signal may comprise, for example, any suitable alert or notification indicative of a location of a mobile device (and an associated user) and capable of guiding an ERT or other search and rescue party to a location of such a mobile device. In some instances, a broadcast signal may comprise, for example, a modified present signal transmitted by a mobile device without sensing a base station signal to announce its presence in a particular area or location, such as an area associated with an emergency condition. As was also indicated, at times, a broadcast signal may comprise, for example, a one-way peer-to-peer broadcast signal capable of being transmitted by a mobile device directly to one or more peer devices in some manner, such as in an absence of a cellular or like wireless communications network.

With regard to operation 304, based, at least in part, on an invoked mode, a mobile device may, for example, transmit a broadcast signal in a suitable manner. For example, a broadcast signal may be transmitted simultaneously with another broadcast signal (e.g., an audio and visual signals transmitted together, etc.), in any suitable sequence, at any pre-defined time intervals, in a certain signaling pattern, or the like. Also, a broadcast signal may be transmitted continually, for example, or periodically so as to conserve battery power. For example, in some instances, such as after determining that an emergency condition exists, a mobile device may be capable of changing a power state, such as transitioning into a lower-power mode and may vary or adjust in some manner a time period between transmissions of a broadcast signal initiated in connection with a modified present signal mode. As a way of illustration, a mobile device may, for example, increase an interval or period between signal transmissions after receiving an acknowledgement from an ERT's radio source (e.g., a base station, peer device, etc.) that a broadcast signal has been received. As another possible example, having detected low battery power, a mobile device may, for example, further increase a time interval between transmissions of a broadcast signal. For example, a mobile device may transmit a signal once every hour (e.g., at the same time, etc.) for a certain number of hours (e.g., for 10 hours, etc.), then increase a time interval between transmissions for another number of hours (e.g., one transmission every two hours, etc.), or the like.

Figure 4:
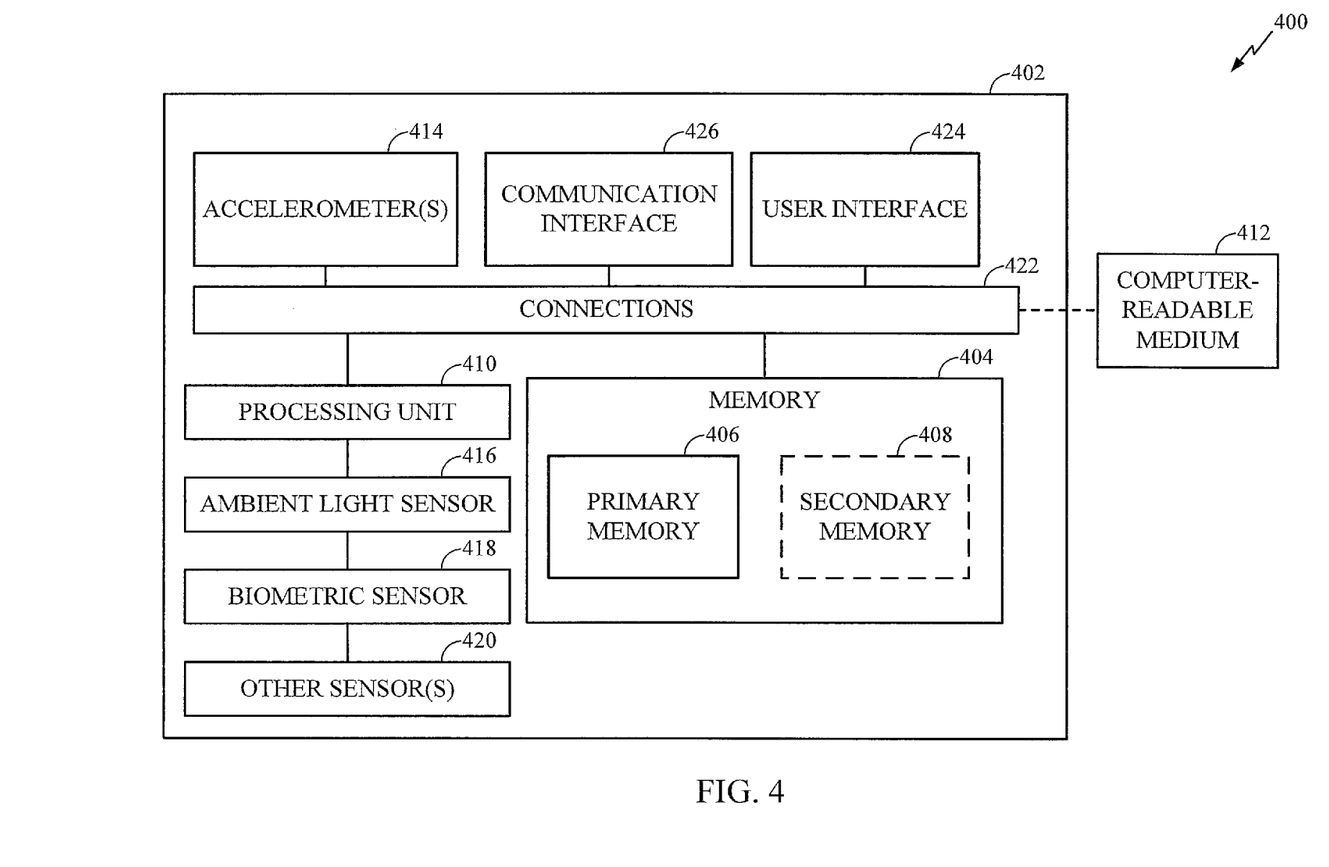
FIG. 4 is a schematic diagram illustrating an example computing environment associated with a mobile device according to an implementation.

FIG. 4 is a schematic diagram illustrating an implementation of an example computing environment 400 that may include one or more devices capable of partially or substantially implementing or supporting one or more operations or processes for a modified present signal mode. It should be appreciated that all or part of various devices shown in computing environment 400, processes, or methods, as described herein, may be implemented using various hardware, firmware, or any combination thereof along with software.

Computing environment 400 may include, for example, a mobile device 402, which may be capable of communicating directly with one or more other devices (e.g., mobile devices, peer devices, etc.) in some manner, such as in an absence of a cellular or like wireless communications network. It should be noted that in some instances, such as during typical cellular or like wireless network-related communications, mobile device 402 may be communicatively coupled to any number of other devices, mobile or otherwise, via a suitable communications network, such as a cellular telephone network, the Internet, mobile ad-hoc network, wireless sensor network, or the like. In an implementation, mobile device 402 may be representative of any electronic device, appliance, or machine that may be capable of exchanging wireless information. For example, mobile device 402 may include one or more computing devices or platforms associated with, for example, cellular telephones, satellite telephones, smart telephones, personal digital assistants (PDAs), laptop computers, personal entertainment systems, e-book readers, tablet personal computers (PC), personal audio or video devices, personal navigation devices, or the like. In certain example implementations, mobile device 402 may take the form of one or more integrated circuits, circuit boards, or the like that may be operatively enabled for use in another device. Thus, unless stated otherwise, to simplify discussion, various functionalities, elements, components, etc. are described below with reference to mobile device 402 may also be applicable to other devices not shown so as to support one or more processes associated with example computing environment 400.

Although not shown, optionally or alternatively, there may be additional devices, mobile or peer, communicatively coupled to mobile device 402 to facilitate or otherwise support one or more processes associated with computing environment 400, as discussed above. For example, computing environment 400 may include various computing or communication resources capable of obtaining position or location information with regard to mobile device 402 based, at least in part, on one or more broadcast signals transmitted by mobile device 402. To illustrate, in certain example implementations, computing environment 400 may include, for example, one or more peer devices capable of acquiring or obtaining all or part of position or location information with respect to mobile device 402. Location or other suitable information (e.g., phone ID, transmitted call sign, etc.) may be provided by mobile device in support of one or more processes in response to invoked modified present signal mode, for example. Location information may, for example, be stored in some manner in memory 404 along with other suitable or desired information, such as one or more signaling patterns, pre-defined time intervals, transmission instructions, broadcast signals, or the like.

Memory 404 may represent any suitable or desired information storage medium. For example, memory 404 may include a primary memory 406 and a secondary memory 408. Primary memory 406 may include, for example, a random access memory, read only memory, etc. While illustrated in this example as being separate from a processing unit 410, it should be appreciated that all or part of primary memory 406 may be provided within or otherwise co-located/coupled with processing unit 410. Secondary memory 408 may include, for example, the same or similar type of memory as primary memory or one or more information storage devices or systems, such as, for example, a disk drive, an optical disc drive, a tape drive, a solid state memory drive, etc. In certain implementations, secondary memory 408 may be operatively receptive of, or otherwise enabled to be coupled to, a computer-readable medium 412.

Computer-readable medium 412 may include, for example, any medium that can store or provide access to information, code or instructions (e.g., an article of manufacture, etc.) for one or more devices associated with computing environment 400. For example, computer-readable medium 412 may be provided or accessed by processing unit 410. As such, in certain example implementations, the methods or apparatuses may take the form, in whole or part, of a computer-readable medium that may include computer-implementable instructions stored thereon, which, if executed by at least one processing unit or other like circuitry, may enable processing unit 410 or the other like circuitry to perform all or portions of a location determination processes, sensor-based or sensor-supported measurements (e.g., acceleration, deceleration, orientation, tilt, rotation, distance, luminous intensity, etc.), or any like processes to facilitate or otherwise support one or more operations or techniques for a modified present signal mode for mobile device 402. In certain example implementations, processing unit 410 may be capable of performing or supporting other functions, such as communications, navigations, video or like gaming, or the like.

It should be understood that a storage medium, such as memory 404, computer-readable medium 412, etc. may typically, although not necessarily, be non-transitory or may comprise a non-transitory device. In this context, a non-transitory storage medium may include, for example, a device that is physical or tangible, meaning that the device has a concrete physical form, although the device may change state. For example, one or more electrical binary digital signals representative of information, in whole or in part, in the form of zeros may change a state to represent information, in whole or in part, as binary digital electrical signals in the form of ones, to illustrate one possible implementation. As such, "non-transitory" may refer, for example, to any medium or device remaining tangible despite this change in state.

Processing unit 410 may be implemented in hardware or a combination of hardware and software. Processing unit 410 may be representative of one or more circuits capable of performing at least a portion of information computing technique or process. By way of example but not limitation, processing unit 410 may include one or more processors, controllers, microprocessors, microcontrollers, application specific integrated circuits, digital signal processors, programmable logic devices, field programmable gate arrays, or the like, or any combination thereof.

Mobile device 402 may include various components or circuitry, such as, for example, one or more accelerometers 414, ambient light sensors or detectors 416, biometric sensors 418, or various other sensor(s) 420, such as a gyroscope, magnetometer, microphone, camera, health sensors, proximity sensors, etc. to facilitate or otherwise support one or more processes associated with computing environment 400. For example, such sensors may provide analog or digital signals to processing unit 410. Although not shown, it should be noted that mobile device 402 may include an analog-to-digital converter (ADC) for digitizing analog signals from one or more sensors. Optionally or alternatively, such sensors may include a designated (e.g., an internal, etc.) ADC(s) to digitize respective output signals, although claimed subject matter is not so limited.

Although not shown, mobile device 402 may also include a memory or information buffer to collect suitable or desired information, such as, for example, inertial or ambient environment sensor measurement information, and a power source to provide power to some or all of the components or circuitry. A power source may be a portable power source, such as a battery, for example, or may comprise a fixed power source, such as an outlet (e.g. in a house, electric charging station, car, etc.). It should be appreciated that a power source may be integrated into (e.g., built-in, etc.) or otherwise supported by (e.g., stand-alone, etc.) mobile device 402.

Mobile device 402 may include one or more connections 422 (e.g., buses, lines, conductors, optic fibers, etc.) to operatively couple various circuits together, and a user interface 424 (e.g., display, touch screen, keypad, buttons, knobs, microphone, speaker, trackball, data port, etc.) to receive user input, facilitate or support sensor measurements, or provide information to a user. Mobile device 402 may further include a communication interface 426 (e.g., wireless transmitter or receiver, modem, antenna, etc.) to allow for communication with one or more other devices or systems over one or more suitable communications networks or in an absence of such networks, as was indicated.

Methodologies described herein may be implemented by various means depending upon applications according to particular features or examples. For example, such methodologies may be implemented in hardware, firmware, software, discrete/fixed logic circuitry, any combination thereof, and so forth. In a hardware or logic circuitry implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices or units designed to perform the functions described herein, or combinations thereof, just to name a few examples.

For a firmware or software implementation, the methodologies may be implemented with modules (e.g., procedures, functions, etc.) having instructions that perform the functions described herein. Any machine readable medium tangibly embodying instructions may be used in implementing the methodologies described herein. For example, software codes may be stored in a memory and executed by a processor. Memory may be implemented within the processor or external to the processor. As used herein the term "memory" refers to any type of long term, short term, volatile, nonvolatile, or other memory and is not to be limited to any particular type of memory or number of memories, or type of media upon which memory is stored. In at least some implementations, one or more portions of the herein described storage media may store signals representative of data or information as expressed by a particular state of the storage media. For example, an electronic signal representative of data or information may be "stored" in a portion of the storage media (e.g., memory) by affecting or changing the state of such portions of the storage media to represent data or information as binary information (e.g., ones and zeros). As such, in a particular implementation, such a change of state of the portion of the storage media to store a signal representative of data or information constitutes a transformation of storage media to a different state or thing.

As was indicated, in one or more example implementations, the functions described may be implemented in hardware, software, firmware, discrete/fixed logic circuitry, some combination thereof, and so forth. If implemented in software, the functions may be stored on a physical computer-readable medium as one or more instructions or code. Computer-readable media include physical computer storage media. A storage medium may be any available physical medium that can be accessed by a computer. By way of example, and not limitation, such computer-readable media can comprise RAM, ROM, EEPROM, CD-ROM or other optical disc storage, magnetic disk storage or other magnetic storage devices, or any other medium that can be used to store desired program code in the form of instructions or data structures and that can be accessed by a computer or processor thereof. Disk and disc, as used herein, includes compact disc (CD), laser disc, optical disc, digital versatile disc (DVD), floppy disk and blue-ray disc where disks usually reproduce data magnetically, while discs reproduce data optically with lasers.

As discussed above, a mobile device may be capable of communicating with one or more other devices via wireless transmission or receipt of information over various communications networks or in an absence of such networks using one or more wireless communication techniques. Here, for example, typical wireless communication techniques may be implemented using a wireless wide area network (WWAN), a wireless local area network (WLAN), a wireless personal area network (WPAN), or the like. The term "network" and "system" may be used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a Long Term Evolution (LTE) network, a WiMAX (IEEE 802.16) network, and so on. A CDMA network may implement one or more radio access technologies (RATs) such as cdma2000, Wideband-CDMA (W-CDMA), Time Division Synchronous Code Division Multiple Access (TD-SCDMA), to name just a few radio technologies. Here, cdma2000 may include technologies implemented according to IS-95, IS-2000, and IS-856 protocols. A TDMA network may implement Global System for Mobile Communications (GSM), Digital Advanced Mobile Phone System (D-AMPS), or some other RAT. GSM and W-CDMA are described in documents from a consortium named "3rdGeneration Partnership Project" (3GPP). Cdma2000 is described in documents from a consortium named "3rd Generation Partnership Project 2" (3GPP2). 3GPP and 3GPP2 documents are publicly available. A WLAN may include an IEEE 802.11x network, and a WPAN may include a Bluetooth network, an IEEE 802.15x, or some other type of network, for example. The techniques may also be implemented in conjunction with any combination of WWAN, WLAN, or WPAN. Wireless communication networks may include so-called next generation technologies (e.g., "4G"), such as, for example, Long Term Evolution (LTE), Advanced LTE, WiMAX, Ultra Mobile Broadband (UMB), or the like.

In an implementation, a mobile device may, for example, be capable of communicating directly with one or more peer devices in an absence of a cellular or like wireless communications network. As previously mentioned, in some instances, a mobile device may, for example, be capable of communicating with one or more femtocells for the purpose of estimating its location. As used herein, "femtocell" may refer to one or more smaller-size cellular base stations that may be enabled to detect a wireless signal transmitted from a mobile device using one or more appropriate techniques. Typically, although not necessarily, a femtocell may utilize or otherwise be compatible with various types of communication technology such as, for example, Universal Mobile Telecommunications System (UTMS), Long Term Evolution (LTE), Evolution-Data Optimized or Evolution-Data only (EV-DO), GSM, Worldwide Interoperability for Microwave Access (WiMAX), Code division multiple access (CDMA)-2000, or Time Division Synchronous Code Division Multiple Access (TD-SCDMA), to name just a few examples among many possible. In certain implementations, a femtocell may comprise integrated WiFi, for example. However, such details relating to femtocells are merely examples, and claimed subject matter is not so limited.

Also, if applicable, computer-readable code or instructions may be transmitted via signals over physical transmission media from a transmitter to a receiver (e.g., via electrical digital signals). For example, software may be transmitted from a website, server, or other remote source using a coaxial cable, fiber optic cable, twisted pair, digital subscriber line (DSL), or physical components of wireless technologies such as infrared, radio, and microwave. Combinations of the above may also be included within the scope of physical transmission media. Such computer instructions or data may be transmitted in portions (e.g., first and second portions) at different times (e.g., at first and second times). Some portions of this Detailed Description are presented in terms of algorithms or symbolic representations of operations on binary digital signals stored within a memory of a specific apparatus or special purpose computing device or platform. In the context of this particular Specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared, or otherwise manipulated.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussions utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. Though, it should be noted that this is merely an illustrative example and claimed subject matter is not limited to this example.

While certain example techniques have been described and shown herein using various methods or systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to particular examples disclosed, but that such claimed subject matter may also include all implementations falling within the scope of the appended claims, and equivalents thereof.

What is claimed is:

1. A method comprising:
   automatically invoking, at a mobile device, a modified present signal mode for transmitting a broadcast signal responsive to a detection of an unavailability of a communications network while in a presence of an emergency condition, wherein said broadcast signal comprises a modified present signal initiated without an attempt by said mobile device to poll said communications network while in said presence of said emergency condition, and
   wherein said mode is invoked automatically, such as without receiving a signal from a radio signal source while inside an operational range of said communications network.

2. The method of claim 1, wherein said broadcast signal comprises at least one of the following: an audio signal; an encoded radio frequency (RF) signal; an ultrasonic signal; a visual signal; or any combination thereof.

3. The method of claim 1, wherein said modified present signal comprises a signal transmitted by said mobile device to announce its presence in a location inside said operational range of said communications network.

4. The method of claim 1, wherein said modified present signal comprises a signal transmitted by said mobile device to announce its presence in an area associated with said emergency condition.

5. The method of claim 1, wherein said modified present signal comprises a peer-to-peer-type signal transmitted by said mobile device and capable of being detected by a peer device in an absence of said communications network.

6. The method of claim 1, wherein said modified present signal comprises a signal initiated after detecting a failure of said communications network while in said presence of said emergency condition.

7. The method of claim 1, wherein said modified present signal comprises a signal having at least one of the following: a unidirectional radiation pattern; an omnidirectional radiation pattern; or any combination thereof.

8. The method of claim 1, wherein said presence of said emergency condition is detected based, at least in part, on at least one input signal received from at least one sensor disposed in said mobile device.

9. The method of claim 1, wherein said presence of said emergency condition is detected based, at least in part, on at least one entry in a log of broadcasted warning messages stored in memory of said mobile device.

10. The method of claim 1, wherein said communications network comprises at least one of the following: a cellular provider network; a wireless ad-hoc network; a wireless safety network; a wireless emergency communications network; a satellite-based search and rescue (SAR) network; or any combination thereof.

11. The method of claim 1, and further comprising transmitting said broadcast signal based, at least in part, on said invoked mode.

12. The method of claim 1, wherein said broadcast signal comprises a one-way peer-to-peer-type signal transmitted by said mobile device.

13. The method of claim 12, wherein said one-way peer-to-peer-type signal transmitted by said mobile device comprises a signal capable of guiding a peer device to a location of said mobile device inside said operational range of said communications network.

14. The method of claim 1, and further comprising:
changing a power state of said mobile device while in said presence of said emergency condition in response to at least one of the following: a receipt of signal indicative of an acknowledgment that said broadcast signal has been received; a receipt of a signal indicative of low battery power of said mobile device; or any combination thereof.

15. The method of claim 14, wherein said changing said power state of said mobile device comprise powering down a transmitter disposed in said mobile device.

16. The method of claim 1, wherein said broadcast signal is indicative of at least one of the following: a location of said mobile device inside said operational range of said communications network; a condition of an associated user; or any combination thereof.

17. The method of claim 1, wherein said operational range is defined by a geographic area within which said mobile device is capable of receiving a pilot-type signal from at least one base station associated with said communications network.

18. An apparatus comprising:
a mobile device comprising a transmitter and at least one processor to:
automatically invoke a modified present signal mode for transmitting a broadcast signal responsive to a detection of an unavailability of a communications network while in a presence of an emergency condition, wherein said broadcast signal comprises a modified present signal initiated without an attempt by said mobile device to poll said communications network while in said presence of said emergency condition, and
wherein said mode is invoked automatically, such as without receiving a signal from a radio signal source while inside an operational range of said communications network.

19. The apparatus of claim 18, wherein said broadcast signal comprises at least one of the following: an audio signal; an encoded radio frequency (RF) signal; an ultrasonic signal; a visual signal; or any combination thereof.

20. The apparatus of claim 18, wherein said modified present signal comprises a signal transmitted by said mobile device to announce its presence in an area associated with said emergency condition.

21. The apparatus of claim 18, wherein said modified present signal comprises a peer-to-peer-type signal transmitted by said mobile device and capable of being detected by a peer device in an absence of said communications network.

22. The apparatus of claim 18, wherein said modified present signal comprises a signal initiated after detecting a failure of said communications network while in said presence of said emergency condition.

23. The apparatus of claim 18, wherein said operational range is defined by a geographic area within which said mobile device is capable of receiving a pilot-type signal from at least one base station associated with said communications network.

24. An apparatus comprising:
means for inferring, at a mobile device, a presence of an emergency condition; and
means for automatically invoking a modified present signal mode for transmitting a broadcast signal responsive to a detection of an unavailability of a communications network while in a presence of an emergency condition, wherein said broadcast signal comprises a modified present signal initiated without an attempt by said mobile device to poll said communications network while in said presence of said emergency condition, and
wherein said mode is invoked automatically, such as without receiving a signal from a radio signal source while inside an operational range of said communications network.

25. The apparatus of claim 24, wherein said broadcast signal comprises at least one of the following: an audio signal; an encoded radio frequency (RF) signal; an ultrasonic signal; a visual signal; or any combination thereof.

26. The apparatus of claim 24, wherein said modified present signal comprises a signal transmitted by said mobile device to announce its presence in an area associated with said emergency condition.

27. The apparatus of claim 24, wherein said modified present signal comprises a peer-to-peer-type signal transmitted by said mobile device and capable of being detected by a peer device in an absence of said communications network.

28. The apparatus of claim 24, wherein said modified present signal comprises a signal initiated after detecting a failure of said communications network while in said presence of said emergency condition.

29. The apparatus of claim 24, wherein said means for inferring said presence of said emergency condition comprises means for automatically inferring said presence of said emergency condition.

30. The apparatus of claim 24, wherein said presence of said emergency condition is detected based, at least in part, on at least one input signal received from at least one sensor disposed in said mobile device.

31. The apparatus of claim 24, wherein said presence of said emergency condition is detected based, at least in part, on at least one entry in a log of broadcasted warning messages stored in memory of said mobile device.

32. The apparatus of claim 24, wherein said communications network comprises at least one of the following: a wireless communications network; a wireless ad-hoc network; a wireless safety network; an emergency communications network; a satellite-based search and rescue (SAR) network; or any combination thereof.

33. The apparatus of claim 24, wherein said operational range is defined by a geographic area within which said mobile device is capable of receiving a pilot-type signal from at least one base station associated with said communications network.

34. An article comprising:

a non-transitory storage medium having instructions stored thereon executable by a special purpose computing platform at a mobile device to:

automatically invoke, at a mobile device, a modified present signal mode for transmitting a broadcast signal responsive to a detection of an unavailability of a communications network while in a presence of an emergency condition, wherein said broadcast signal comprises a modified present signal initiated without an attempt by said mobile device to poll said communications network while in said presence of said emergency condition, and wherein said mode is invoked automatically, such as without receiving a signal from a radio signal source while inside an operational range of said communications network.

35. The article of claim 34, wherein said modified present signal comprises a signal transmitted by said mobile device to announce its presence in at least one of the following: a location of said mobile device inside said operational range of said communications network; an area associated with said emergency condition; or any combination thereof.

36. The article of claim 35, wherein said modified present signal comprises a peer-to-peer-type signal transmitted by said mobile device and capable of being detected by a peer device in an absence of said communications network.

37. The article of claim 34, wherein said operational range is defined by a geographic area within which said mobile device is capable of receiving a pilot-type signal from at least one base station associated with said communications network.

\* \* \* \* \*